United States Patent [19]

Hübner

[11] Patent Number: 5,456,186

[45] Date of Patent: Oct. 10, 1995

[54] BELLOWS FOR ARTICULATED VEHICLES

[75] Inventor: Reinhard Hübner, Kassel, Germany

[73] Assignee: Hubner Gummi - und Kunstoff GmbH, Germany

[21] Appl. No.: 309,613

[22] Filed: Sep. 21, 1994

Related U.S. Application Data

[63] Continuation of Ser. No. 981,169, Nov. 24, 1992, abandoned.

[30] Foreign Application Priority Data

Nov. 27, 1991 [DE] Germany ............. 41 38 922.0
Dec. 7, 1991 [DE] Germany ............. 41 40 418.1

[51] Int. Cl.⁶ ..................................................... B61D 15/00
[52] U.S. Cl. ............................................................. 105/18
[58] Field of Search ........................ 105/18, 15; 280/403

[56] References Cited

U.S. PATENT DOCUMENTS

| | | | |
|---|---|---|---|
| 903,893 | 11/1908 | Schroyer | 105/18 |
| 1,078,757 | 11/1913 | Whitmore | 105/18 |
| 1,450,007 | 3/1923 | Pflager | 105/18 |
| 1,891,964 | 12/1932 | Whitmore | 105/18 |
| 2,169,694 | 8/1939 | Hendrickson | 165/18 |
| 4,860,665 | 8/1989 | Schmidt | 105/18 |

FOREIGN PATENT DOCUMENTS

| | | | |
|---|---|---|---|
| 0374802 | 6/1932 | United Kingdom | 105/18 |
| 0471036 | 8/1937 | United Kingdom | 105/18 |

*Primary Examiner*—Mark T. Le
*Attorney, Agent, or Firm*—Levine & Mandelbaum

[57] ABSTRACT

A bellows for articulated vehicles has side walls reinforced to have greater rigidity that the top and bottom of the bellows in order to enable relative horizontal motion while preventing bulging or collapsing of the side walls. The side walls may have one or more added layers to impart greater rigidity or may include materials inherently more rigid than those used in the top and bottom of the bellows.

1 Claim, 5 Drawing Sheets

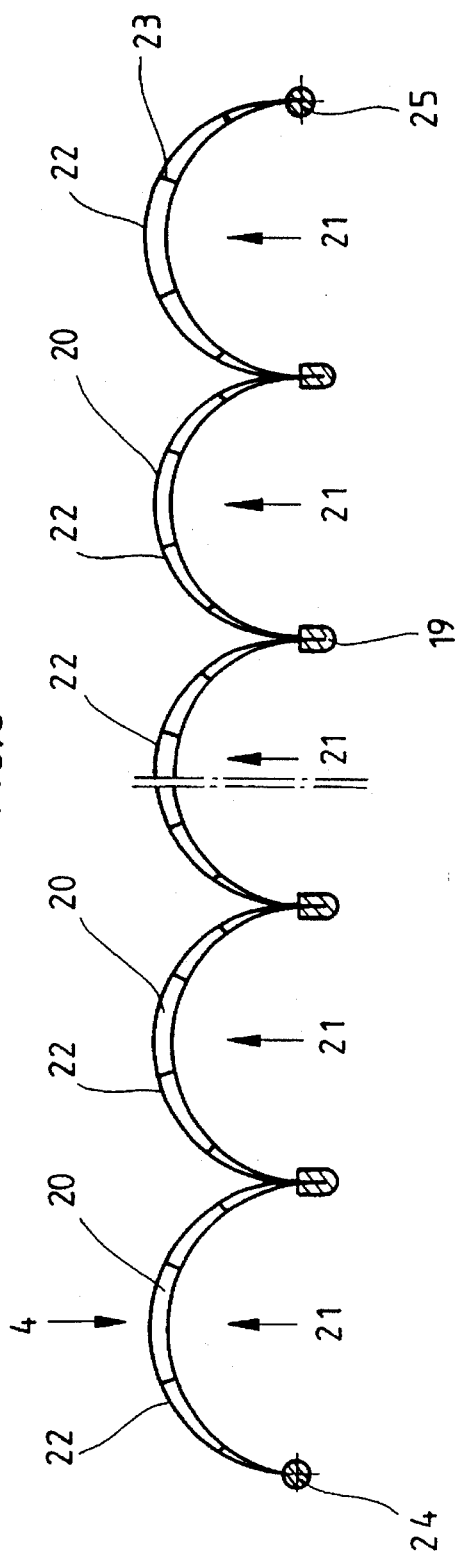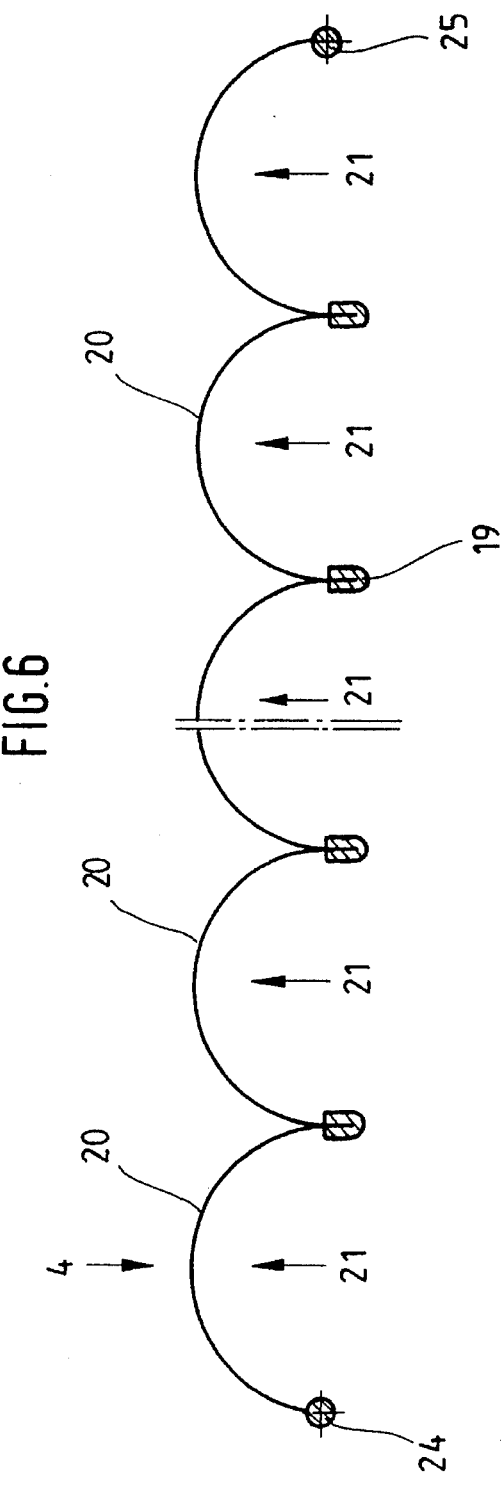

BELLOWS FOR ARTICULATED VEHICLES

This is a continuation of application Ser. No. 07/981,169 filed on Nov. 24, 1992 now abandoned.

BACKGROUND OF THE INVENTION

The present invention pertains to a bellows, as it is installed between two vehicles which are connected to one another in an articulated manner. Thus, passengers can reach from one vehicle to another via a transition platform, without their being exposed to weather and relative wind unprotected (e.g., U.S. Pat. No. 4,860,665, FIG. 1, corresponding to FIG. 1 of the present application).

Such a bellows has a top and two side walls as well as a transition area between the top and each side wall. If necessary, the lower ends of the side walls are connected to one another under the transition platform by a bellows bottom (e.g., EP 275,365). Corresponding to the bellows top, the bellows bottom is connected with one of the side walls on each end via a transition area.

Such a bellows is usually designed such that the bottom is divided at a seam in the center running in the longitudinal direction, and a fold runs from one edge of the separation line via the associated bellows bottom half, a lower transition area, a bellows side wall, an upper transition area, the bellows top, another upper transition area, the second bellows side wall, another lower transition area, and finally, the other bellows bottom half to the other edge of the seam of the bellows bottom (EP 114,913). If such a bellows is installed, then it is connected along the seam by suitable seals.

Normally, such a bellows is composed of individual strips, each of which has the cross section of a V or even, for example, of a semicircle. Two consecutive strips are held together on the edges by frames (e.g., U.S. Pat. No. 4,690,421). Along the entire length in the circumferential direction of the bellows, the individual strips or folds actually have the same material and deformation properties. By this it is meant that, the bellows is rather rigid in the transition area between the side walls and the top or bottom. This is undesirable. Therefore, it has already been proposed to especially design the bellows in the transition areas in order to make the "bellows corners" softer, than they actually are. In order to achieve this, the individual strips can be composed of individual sections which are consecutive in the bellows circumferential direction, whereby a material is used for the transition areas, said material being softer than the material for the side walls, the top and the bottom (EP 275,365). A corresponding effect can also be achieved in that additional folds are installed in the transition areas, by means of which the bellows is also softer in the transition areas, than would otherwise be the case (DE 26 17 931).

Finally, a process is also known for hanging another wall in front of the side walls of a bellows, in order to have an especially good sound insulation in the area of the side walls or in order to have an invisible space between the bellows side wall and the curtain type wall for the passengers, in which space function elements can be housed (U.S. Pat. No. 4,690,421).

SUMMARY OF THE INVENTION

The task of the present invention is to be able to better adapt such a bellows to operating conditions. Operating conditions mean: The bellows should be able to easily deform in the longitudinal direction; said bellows should also hinder lateral and vertical relative movements between the vehicles only slightly, and finally, it should be rigid such that it does not sag.

To solve the problem described, the present invention proposes that the bellows have special reinforcing means in the areas of the side walls.

The bellows can be rather soft in all areas, so that it essentially does not hinder relative movement between the vehicles in this respect. Only the side walls, which actually have only little influence on the relative movements between the individual vehicles, can be reinforced by means of the reinforcing means, such that the bellows does not even sag downwards when it has a long length, with the distance between the two vehicles therefore being relatively great.

Such a measure is not necessary in the top and in the bottom, because the width of the bellows, as a rule, is essentially less than its length, so that the top and bottom are held securely in the longitudinal direction and are hindered from sagging, while they actually tend even less to sag simply due to the low width of the bellows. The transition areas can easily be deformed, without being turned up, e.g., outwards, because they are also held by the side walls. If necessary, the transition can continuously take place increasingly or decreasingly from the rigid walls into the softer top and the softer bottom into the transition areas, so that different requirements can also be taken into consideration.

The present invention especially demonstrates possibilities of how the bellows side walls can be reinforced in an especially advantageous manner.

DESCRIPTION OF THE DRAWINGS

The present invention is clarified below by means of the drawing. In the drawing.

FIGS. 5 and 6 show bellows cross sections in a side wall (FIG. 5) and a bellows top (FIG. 6), respectively.

DESCRIPTION OF THE PREFERRED EMBODIMENT

Figure 1:
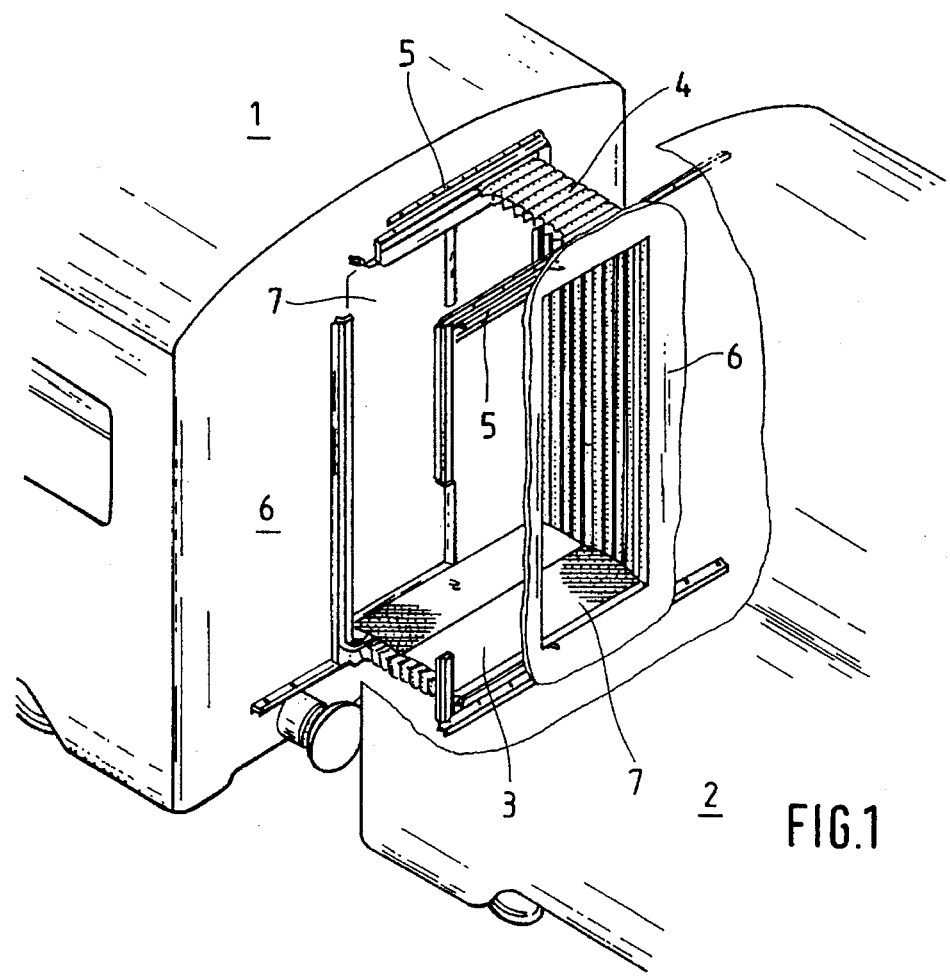
FIG. 1 shows the transition area between two passenger cars that are connected with one another in an articulated manner with a transition platform and bellows in perspective view.
Figure 2:
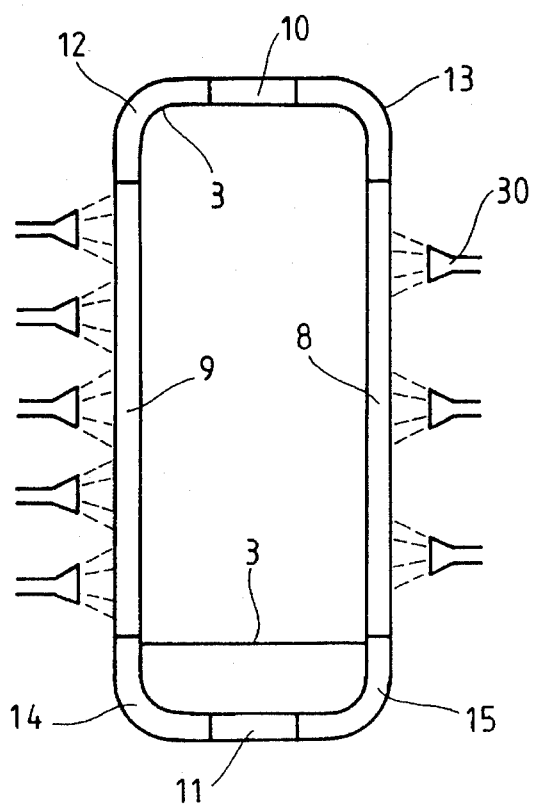
FIG. 2 shows a simplified view of a cross section of a bellows or of a view of one of the ends of the bellows.
Figure 3:
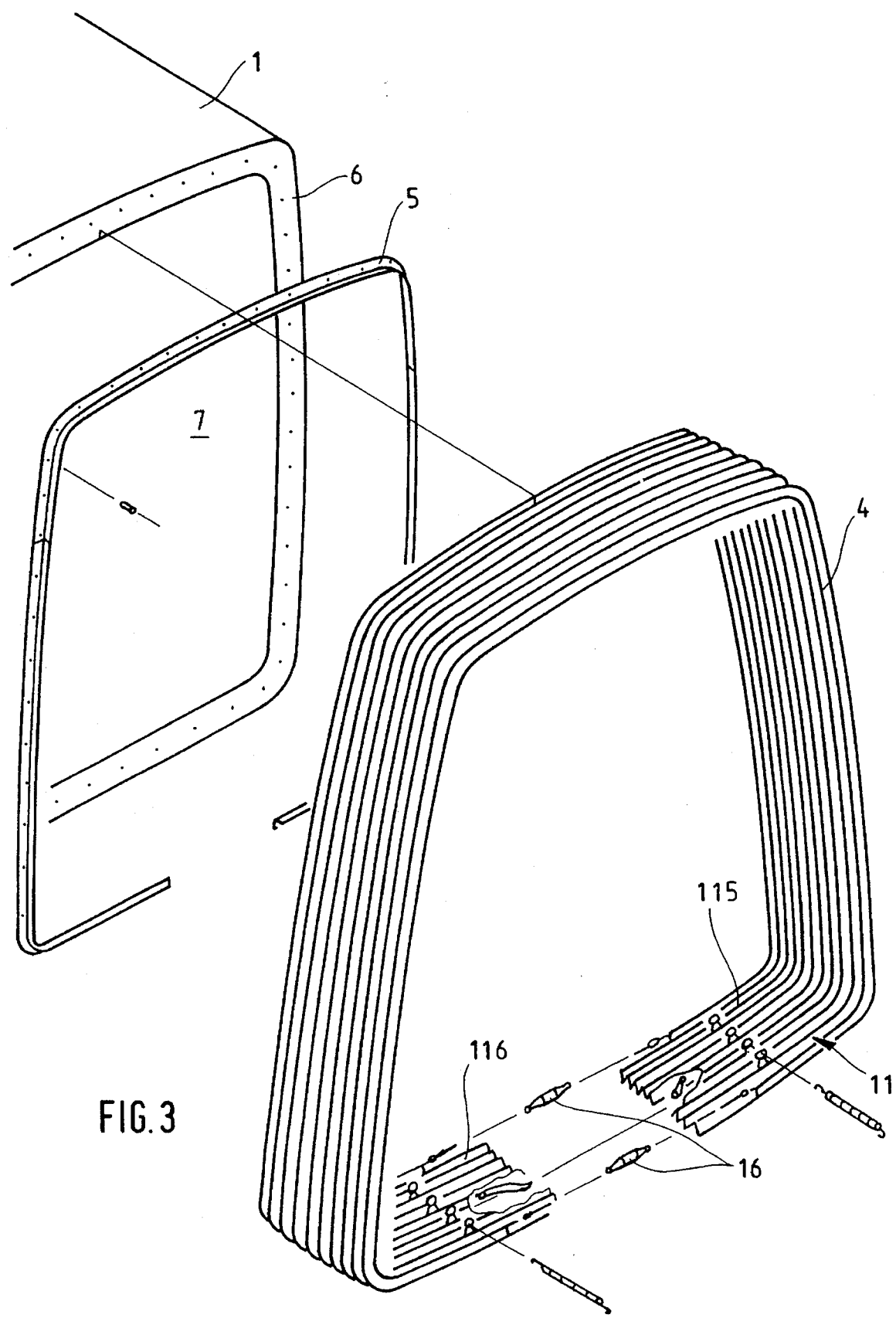
FIG. 3 shows a bellows divided in its longitudinal direction along the bellows bottom in perspective view.

A transition platform 3 is arranged between two passenger cars 1, 2 (FIG. 1). In order to make it possible for passengers to enter the transition platform from inside the two passenger cars, each of the two passenger cars 1, 2 is provided with a passage opening 7 in the front side 6. In order to make it possible for the passengers to remain on the transition platform 3 unimpaired by environmental influences (rain, snow, dust, relative wind), said transition platform is surrounded by a bellows 4. The bellows 4 has an end frame 5 on each end, and with this end frame, the bellows is attached to the two facing ends of the two passenger cars. In this manner, the bellows surrounds the front wall openings 7 and the transition platform 3. The bellows 4 has two side walls 8 and 9, which are connected with one another on the upper end by means of the bellows top 10 and on the lower end under the platform 3 by means of the bellows bottom 11 (FIG. 2). Transition areas 12, 13 above connect the side walls 8, 9 with the bellows top 10, and transition areas 14, 15 below connect the side walls 8, 9 with the bellows bottom 11. The bellows bottom 11 is divided in the longitudinal direction. For assembly, the bellows has approximately the position shown in FIG. 3, so that the bellows bottom 11 can be placed under the platform 3. Then, the two halves 11*a* and 11*b* of the bellows bottom 11 are connected to one another by connection devices 16, whereby the front sides of the bellows bottom halves facing each other lie next to one another or the bellows bottom halves overlap somewhat. In any case, after being attached to the facing ends 6 of the passenger cars 1, 2 and closing of the connection means 16, the bellows forms a sealed conduit against relative wind, snow, rain and dirt, in which the transition platform 3 is located.

Figure 4:
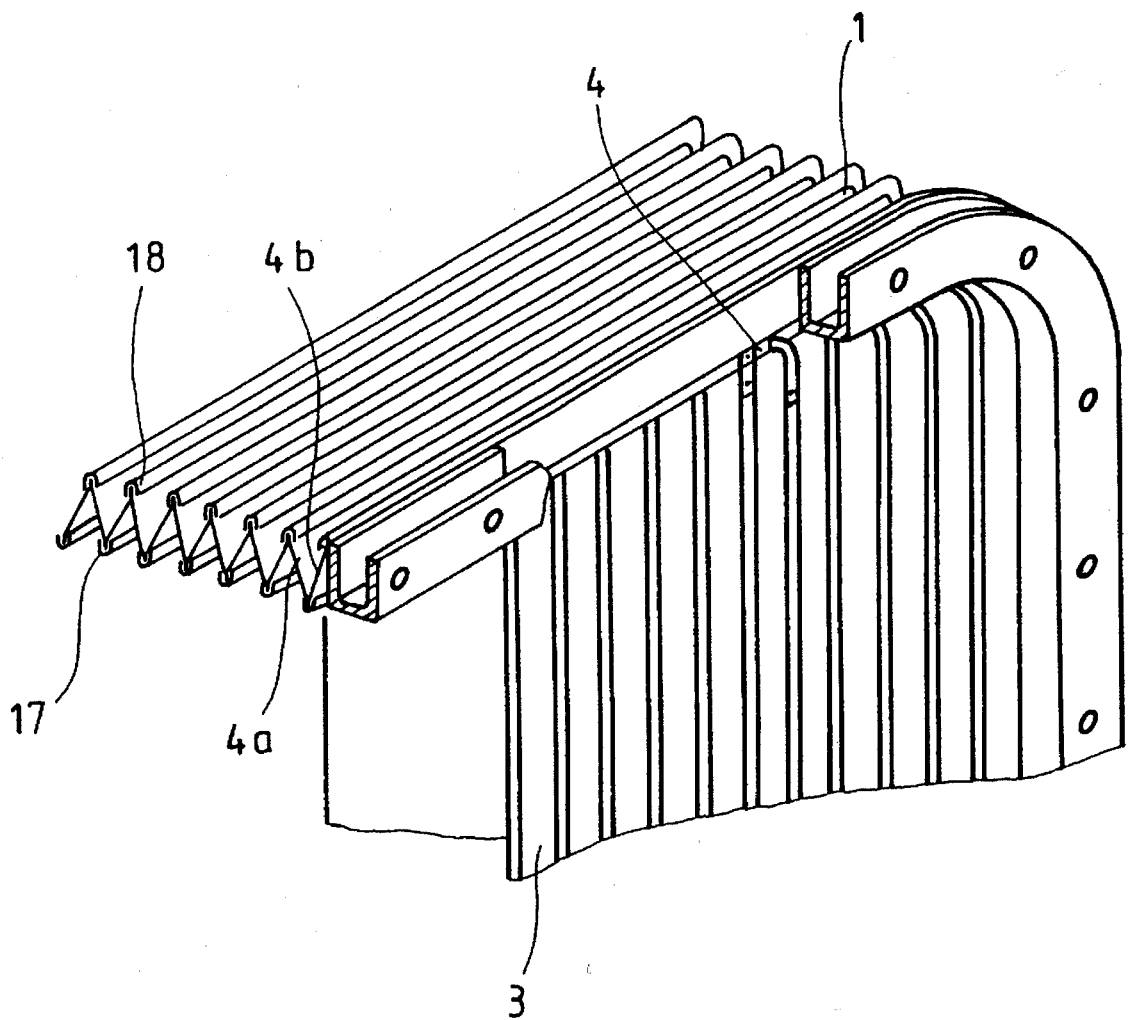
FIG. 4 shows section of a bellows in perspective view, whereby a vertical section is taken through the top of the bellows.

A possible cross-sectional shape of the bellows is shown in enlarged view in FIG. 4. The bellows is zigzagged. In this case, two flat material strips 4*a*, 4*b* form a "V" and are connected with one another on the tip of the "V" by a frame 17. Two consecutive "V"s of this type are connected with one another by another frame 18. The frames 17 and 18 are groove-shaped profile sections consisting especially of aluminum, which hold together two bellows strips by means of clamping action.

According to FIG. 5, the grooves formed by the material strips are not zigzagged. They have, in cross section, the shape of a semicircle bent from a web of fabric, and two consecutive semicircles are held together at adjacent edges by means of clamping profile sections or frames 19, which correspond to the frames 17, 18.

The conventional construction, previously described does not need to be explained in detail.

The design in accordance with the present invention of a bellows is described with reference to FIGS. 1 to 4, and is shown in a special embodiment in FIG. 5. FIG. 5 shows a bellows cross section in the area of the bellows side walls 8, 9.

The bellows consists of several consecutive "folds" in the longitudinal direction of the bellows, which "folds", however, have the shape of semicircular waves in cross section, whereby the inner area enclosed by the bellows is designated by the arrows 21. The waves are individual webs of fabric, and every two webs of fabric are held together on the edges facing one another by means of profile sections 19. Thus, another wall 22, which is designed and contoured like the actual bellows side wall and whose webs of fabric are correspondingly connected with one another with the clamping profile sections 19 and with the webs of fabric of the actual bellows wall, is used to reinforce the wall. Moreover, the two bellows wall layers 20, 22 are connected with one another by means of webs 23.

The attachment of the bellows to the vehicles 1, 2 takes place with end frames 24, 25. In the area of each groove or semicircular wave of the actual bellows wall, the groove or semicircular wave 22 of the outer wall is held at a predetermined distance from the material strips of the inner wall by means of the webs 23 which are spaced from the apex of each groove to the sides, until both bellows strips approach one another towards the edges, where they finally overlap in the area of the edges. With the two edges overlapping, both bellows wall edges are then securely held in a common clamping profile section or frame 19 or 24 or 25. They border an intermediate space, which has the shape of a regular crescent moon, as long as the bellows remains unstressed in its regular starting position. The above-mentioned webs 23 are located in the crescent-moon-shaped space.

In accordance with the present invention, such a bellows design is available in the area of the bellows side walls 8, 9 (FIG. 2). In the areas of the bellows top 10, the bellows bottom 11 and the transition areas 12 to 15, the bellows has the contour of grooves as shown in FIG. 6. Thus, FIG. 5 shows a bellows wall cross section in the area of the bellows side walls 8, 9, while FIG. 6 shows a corresponding bellows wall cross section in the areas of the bellows top 10, the bellows bottom 11 and the transition areas 12 to 15.

Figure 7:
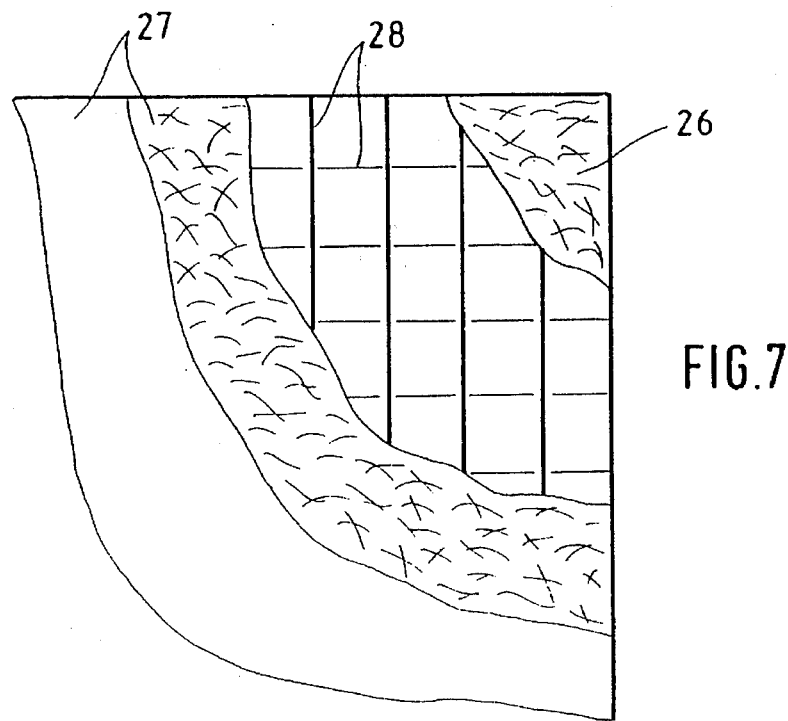
FIGS. 7, 8 and 9 show designs of material for the bellows.
Figure 8:
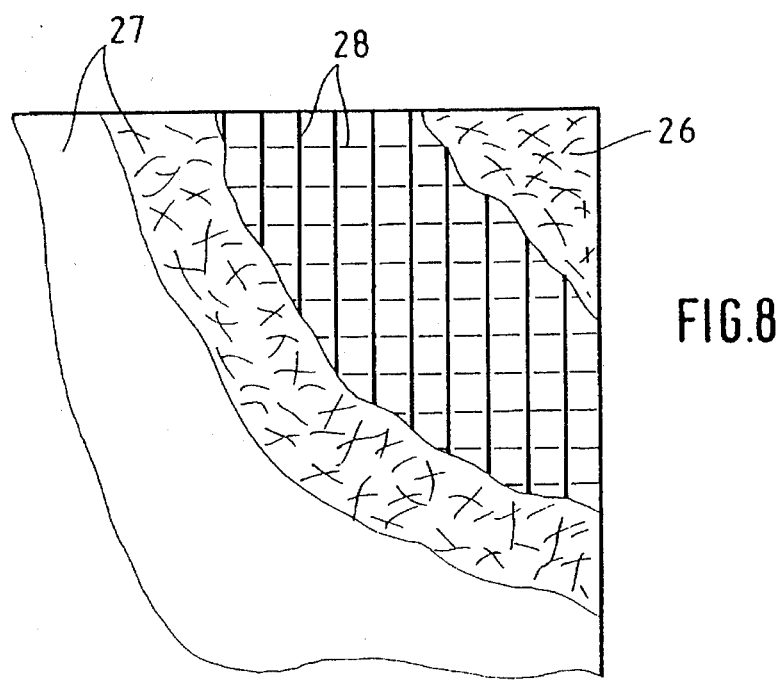

In connection with FIGS. 5 and 6, it was previously assumed that, on the entire bellows circumference, the inner wall 20 and in the area of the side walls 8, 9 also the outer bellows wall consist of the same material, especially a coated woven fabric, whereby the woven coated fabric consists of textile or plastic fibers, and the coating consists of rubber or a rubber-like plastic. Another design is characterized in that the outer bellows wall consists of a stronger material. This can, for example, be achieved in that the attached bellows side wall layer 22 consist of a coated woven fabric, that is relatively impermeable, while 20, i.e., actual bellows wall, the inner bellows wall in the area of the bellows side walls, consists of a coated woven fabric, which has greater distances between the woven fabric threads. FIG. 7 shows a woven fabric 28 coated with rubber or a rubber-like material 26, 27, which is relatively wide-meshed and consequently the material of the actual bellows is wide-meshed. FIG. 8 shows the woven fabric 29 coated with rubber or a rubber-like material 26, 27, which is closer meshed.

This solution leads to another solution for designing the bellows from several consecutive sections in the circumferential direction, which sections are connected separately and with one another. In this case, FIG. 8 shows the bellows material of the side walls 8, 9 in FIG. 2, which consist of the woven fabric 29, or a fabric which can be even closer meshed, while FIG. 7 shows the bellows material in the area of the remaining bellows sections, that is, of the top 10, the bottom 11 and the transition areas 12 to 15, which consists of a the woven fabric, can have an even greater mesh width, i.e., the mesh width can be even greater as shown.

A corresponding effect can be obtained when the same starting material is used on the entire bellows circumference; however, the material is subjected to a hardening treatment in the area of the bellows side walls. In FIG. 2, irradiation devices 30 are arranged about the bellows side walls, so as to only act upon the side walls and make the material used in the area of the side walls harder than it otherwise is, and leave the unradiated of material lesser hardness in the remaining areas, that is, in the entire area except the side walls. Such a process is described in DE 37 11 032 A1 without reference to the present invention.

In the solution with the installed double wall (FIG. 5), the wall placed on the outside with the waves 22 can also be placed on the inside of the bellows.

By changing the firmness with radiation, areas of different hardnesses or firmnesses can be obtained both within the individual bellows sections and within each bellows web.

Figure 9:
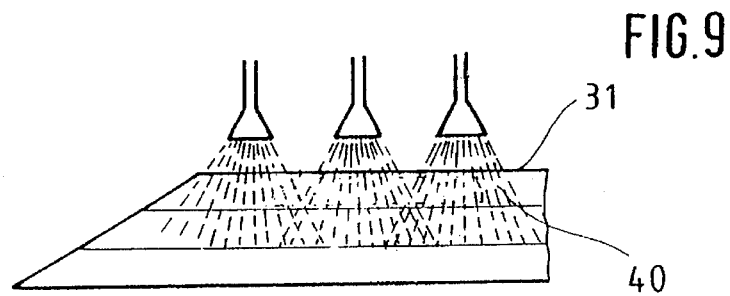

Taking the structure of the bellows according to FIG. 2 with several consecutive sections in the circumferential direction as a basis, it is possible to help each section by means of selective "irradiation crosslinking" to achieve one property, which is optimal for the area of the bellows in which the section should be inserted. The side wall sections 8, 9 can be made especially rigid in the vertical direction, without essentially impairing the flexibility in the other directions. According to FIG. 9, strips 40 are irradiation-crosslinked in each bellows web 31 and for this reason are relatively rigid, so that the majority of the bellows webs make the entire bellows vertically rigid by means of the hardened strips, which have somewhat of a frame function. In this case, mask engineering can be applied, in that the strip sections that are to be kept unchanged are covered by a mask 31, and the energy sources 30 for emitting the radiation energy necessary for crosslinking only impact on the areas of the bellows web to be hardened by irradiation crosslinking which are not covered by a mask. No radiation influence takes place in the transition areas 12–15 so that the transition areas remain soft and in no way harden the entire bellows. In contrast, in the top 10 and bottom 11, several strips 3, which run in the transverse direction of the bellows and succeed one another in the longitudinal direction of the bellows, can again be irradiation-crosslinked, so that a sagging of the bellows top and of the bellows bottom between the bellows side walls is prevented; however, the flexibility in the other directions is not impaired.

Such solutions are possible at relatively low process engineering cost. If one is prepared to pursue a higher process engineering cost, then the entire bellows can be manufactured in one piece (the separating edges between the individual bellows sections are not shown in FIG. 2), and selected bellows areas can be irradiation-crosslinked, i.e., hardened, by applying corresponding masks and correspondingly positioned radiation emitters.

An advantage can particularly be seen in first manufacturing the entire bellows in one piece and then designing areas of appropriate rigidity. In that case, irradiation crosslinking presents itself as especially appropriate; however, other methods may seem more appropriate. Thus, for example, vulcanization can be used advantageously, whereby it may then again be possible to place the transition areas into an optimal contour by means of plastic deformation, which areas then remain in the desired shape for the duration of use.

As is evident from the reinforcing outer wall layers 22 in FIG. 5, these parts can be designed as flat, netted or lattice-like and can be arranged outside or inside the actual bellows wall. Partially reinforcing, flat, netted or lattice-like bracings, which can even assume the function at least of an intermediate frame, can be used. Finally, the bellows material can be inserted into the bellows frame in a different manner.

I claim:

1. A bellows for protection of a passageway between two passenger cars coupled together in an articulated manner, said bellows comprising a roof, first and second side walls, and transition areas connecting said roof and said first and second side walls, said roof, first and second side walls and transition areas comprising a fabric having a mesh of first reinforcing fibers and a coating of a rubber-like material, said bellows further comprising first stiffening means for stiffening said first side wall against vertical forces, and second stiffening means for stiffening said second side wall against vertical forces, each of said stiffening means comprising second reinforcing fibers identical to said first reinforcing fibers, said stiffening means further comprising a third side wall for stiffening said first side wall and a fourth side wall for stiffening said second side wall, said first, second, third and fourth side walls having respective longitudinal edges, and further comprising first clamping profile means for connecting said first and third side walls and second clamping profile means for connecting said second and fourth side walls along their respective longitudinal edges, and further comprising first web means connected between said first and third side walls for maintaining said first and third side walls in spaced relationship and second web means connected between said second and fourth side walls for maintaining said second and fourth side walls in spaced relationship.

* * * * *